US011852236B2

(12) United States Patent
Watanabe (10) Patent No.: US 11,852,236 B2
(45) Date of Patent: Dec. 26, 2023

(54) CONTROL DEVICE OF AUTOMATIC TRANSMISSION

(71) Applicant: Honda Motor Co., Ltd., Tokyo (JP)

(72) Inventor: Takahide Watanabe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/165,330

(22) Filed: Feb. 7, 2023

(65) Prior Publication Data

US 2023/0313885 A1 Oct. 5, 2023

(30) Foreign Application Priority Data

Mar. 31, 2022 (JP) ................................. 2022-060552

(51) Int. Cl.
*F16H 61/00* (2006.01)
*F16H 61/686* (2006.01)

(52) U.S. Cl.
CPC ....... *F16H 61/686* (2013.01); *F16H 61/0009* (2013.01); *F16H 2200/2002* (2013.01)

(58) Field of Classification Search
CPC .............. F16H 61/686; F16H 61/0009; F16H 2200/2002
See application file for complete search history.

(56) References Cited

U.S. PATENT DOCUMENTS

2002/0038580 A1* 4/2002 Horiguchi ............. F16H 61/061
74/732.1

FOREIGN PATENT DOCUMENTS

| CN | 104662334 A | * 5/2015 | ......... F16H 61/0206 |
| JP | 2014219058 A | * 11/2014 | |
| JP | 2017089893 | 5/2017 | |

* cited by examiner

*Primary Examiner* — Justin Holmes
(74) *Attorney, Agent, or Firm* — JCIPRNET (57) ABSTRACT

The disclosure reduces the number of factors to be considered in the switching control of the shift stages, thereby simplifying the switching control. In a control device of an automatic transmission, when a detection part detects that a shift position has been switched from one of a forward range and a reverse range to the other, among multiple hydraulic friction engagement mechanisms, a hydraulic pressure command value is fixed for the hydraulic friction engagement mechanisms that do not change the engaged state between the forward range and the reverse range, and the hydraulic pressure command value is variable based on a hydraulic pressure supplied to the hydraulic friction engagement mechanisms for the hydraulic friction engagement mechanisms that change the engaged state between the forward range and the reverse range.

20 Claims, 8 Drawing Sheets

FIG. 1

|  | C1 | C2 | C3 | B1 | B2 | B3 | F1 | Gear Ratio |
|---|---|---|---|---|---|---|---|---|
| RVS |  |  | ○ |  | ○ |  | ○ | 4.008 |
| 1st |  |  |  | ○ | ○ |  | △/○ | 5.233 |
| 2nd |  | ○ |  | ○ | ○ |  | (△) | 3.367 |
| 3rd |  |  | ○ | ○ | ○ |  | (△) | 2.298 |
| 4th |  | ○ | ○ | ○ |  |  | (△) | 1.705 |
| 5th | ○ |  | ○ | ○ |  |  | (△) | 1.363 |
| 6th | ○ | ○ | ○ |  |  |  | (△) | 1.000 |
| 7th | ○ |  | ○ |  | ○ |  | (△) | 0.786 |
| 8th | ○ | ○ |  |  | ○ |  | (△) | 0.657 |
| 9th | ○ |  |  |  | ○ | ○ | (△) | 0.584 |
| 10th | ○ | ○ |  |  |  | ○ | (△) | 0.520 |
| P/N |  |  |  |  |  |  | △/○ | — |
| RPM | ○ |  | ○ |  | ○ |  | △ | — |

FIG. 2

| Planetary gear mechanism | Gear Ratio |
|---|---|
| P1 | 2.681 |
| P2 | 1.914 |
| P3 | 1.614 |
| P4 | 2.734 |

| Stage | Engagement operation | | | | | | | |
|---|---|---|---|---|---|---|---|---|
| 1 | B3 | B2 | B1 | C3 | C2 | C1 | F1 | RVS preparatory process |
|  | — | ↓ | ↓ | — | — | — | △ | |
| 2 | B3 | B2 | B1 | C3 | C2 | C1 | F1 | |
|  | ○ | — | — | ○ | — | ○ | △ | |
| 3 | B3 | B2 | B1 | C3 | C2 | C1 | F1 | RVS in-gear process |
|  | ○ | — | — | ○ | — | ○ | ○ | |
| 4 | B3 | B2 | B1 | C3 | C2 | C1 | F1 | |
|  | ↓ | ○ | — | ○ | — | ↓ | ○ | |

↓ : Releasing   ○ : Engaged   — : Released   F1/△ : One-way rotation permitting   F1/○ : Rotation blocking

CONTROL DEVICE OF AUTOMATIC TRANSMISSION

CROSS-REFERENCE TO RELATED APPLICATION

This application claims the priority benefit of Japan application serial no. 2022-060552, filed on Mar. 31, 2022. The entirety of the above-mentioned patent application is hereby incorporated by reference herein and made a part of this specification.

BACKGROUND

Technical Field

This disclosure relates to a control device of an automatic transmission.

Related Art

An automatic transmission controlled by a control device is used, which includes multiple planetary gear mechanisms and multiple hydraulic friction engagement mechanisms capable of establishing multiple shift stages by switching transmission paths of drive force in these planetary gear mechanisms. For example, the automatic transmission disclosed in Patent Literature 1 performs engagement control to engage several hydraulic friction engagement mechanisms selected from among multiple hydraulic friction engagement mechanisms when it is detected that the shift position has been switched from the forward range to the reverse range, and suppresses the occurrence of abnormal noise and vibration and improves the responsiveness to shift operations by performing half-engagement control to put any other hydraulic friction engagement mechanisms in a half-engagement state.

CITATION LIST

Patent Literature

[Patent Literature 1] Japanese Patent Application Laid-Open No. 2017-89893

By the way, when the shift position is switched from one of the forward range and the reverse range to the other, depending on the hydraulic friction engagement mechanism, the engaged state may or may not change before and after the shift operation of the automatic transmission. Therefore, it is conceivable to simplify the switching control by reducing the number of factors to be considered in the switching control by performing suitable hydraulic control according to whether the hydraulic friction engagement mechanisms change or do not change the engaged state before and after the shift operation.

Therefore, a control device of an automatic transmission according to this disclosure reduces the number of factors to be considered in the switching control of the shift stages, thereby simplifying the switching control.

SUMMARY

In a control device (100) of an automatic transmission (1) according to an embodiment of the disclosure, wherein the automatic transmission (1) includes: an input shaft (10) to which a drive force is input; an output member (11) that outputs the drive force; multiple planetary gear mechanisms (P1 to P4) that transmit the drive force input by the input shaft (10) to the output member (11); and multiple hydraulic friction engagement mechanisms (C1 to C3 and B1 to B3) capable of establishing multiple shift stages by switching a transmission path of the drive force in the multiple planetary gear mechanisms (P1 to P4). The multiple shift stages include: at least one forward range (1st to 10th) that is establishable when the multiple hydraulic friction engagement mechanisms (C1 to C3 and B1 to B3) are in a first state; and a reverse range (RVS) established when the multiple hydraulic friction engagement mechanisms (C1 to C3 and B1 to B3) are in a second state. The control device (100) includes: a detection part that detects a shift position; and a control part that controls the multiple hydraulic friction engagement mechanisms (C1 to C3 and B1 to B3). Switching control for switching the multiple hydraulic friction engagement mechanisms (C1 to C3 and B1 to B3) from one of the first state and the second state to the other is executable when the detection part detects that the shift position has been switched from one of the forward range and the reverse range to the other. In the switching control, among the multiple hydraulic friction engagement mechanisms (C1 to C3 and B1 to B3), a hydraulic pressure command value is fixed for the hydraulic friction engagement mechanisms (C1 to C3 and B1 to B3) that do not change an engaged state between the forward range (1st to 10th) and the reverse range (RVS), and among the multiple hydraulic friction engagement mechanisms (C1 to C3 and B1 to B3), the hydraulic pressure command value is variable based on a hydraulic pressure supplied to the hydraulic friction engagement mechanisms (C1 to C3 and B1 to B3) for the hydraulic friction engagement mechanisms (C1 to C3 and B1 to B3) that change the engaged state between the forward range (1st to 10th) and the reverse range (RVS).

DESCRIPTION OF THE EMBODIMENTS

According to the control device (100) of the automatic transmission (1), in the hydraulic friction engagement mechanisms (C1 to C3 and B1 to B3) that change the engaged state when switching the shift stages between forward range (1st to 10th) and reverse range (RVS), by making the hydraulic pressure command value variable based on the hydraulic pressure supplied to the hydraulic friction engagement mechanism (C1 to C3 and B1 to B3), it is possible to suppress the occurrence of abnormal noise and vibration. In addition, for hydraulic friction engagement mechanisms (C1 to C3 and B1 to B3) that do not change the engaged state when switching the shift stages between the forward range (1st to 10th) and the reverse range (RVS), by fixing the hydraulic pressure command value, it is possible to reduce the number of factors to be considered in the switching control of the shift stages, thereby simplifying the switching control.

In the control device (100) of the automatic transmission (1) according to an embodiment of the disclosure, in the switching control, among the multiple hydraulic friction engagement mechanisms (C1 to C3 and B1 to B3), the hydraulic pressure command value for the hydraulic friction engagement mechanisms (C1 to C3 and B1 to B3) that do not change the engaged state between the forward range (1st to 10th) and the reverse range (RVS) may be set higher than the hydraulic pressure command value for the hydraulic friction engagement mechanisms (C1 to C3 and B1 to B3) that change the engaged state between the forward range (1st to 10th) and the reverse range (RVS). According to this, it is sufficient to consider adjusting the engaged state only for the hydraulic friction engagement mechanisms (C1 to C3 and B1 to B3) that change the engaged state between the forward range (1st to 10th) and the reverse range (RVS). Therefore, it is possible to reduce the number of factors to be considered in the switching control of the shift stages, thereby simplifying the switching control. Further, if the hydraulic pressure command value for the hydraulic friction engagement mechanisms (C1 to C3 and B1 to B3) that do not change the engaged state is set lower than the hydraulic pressure command value for the hydraulic friction engagement mechanisms (C1 to C3 and B1 to B3) that change the engaged state between the forward range (1st to 10th) and the reverse range (RVS), since it becomes susceptible to the influence of the hydraulic pressure of the hydraulic friction engagement mechanisms (C1 to C3 and B1 to B3) that change the engaged state, complicated control is required, making it difficult to simplify the switching control.

In the control device (100) of the automatic transmission (1) according to an embodiment of the disclosure, the automatic transmission (1) may be configured such that an operating state of the automatic transmission (1) is determined by the engaged state of the hydraulic friction engagement mechanism (C1 to C3 and B1 to B3) with a lowest hydraulic command pressure when the automatic transmission (1) performs control by engaging the multiple hydraulic friction engagement mechanisms (C1 to C3 and B1 to B3). According to this, since the hydraulic friction engagement mechanisms (C1 to C3 and B1 to B3) that do not change the engaged state have a higher fixed hydraulic command pressure than the hydraulic friction engagement mechanisms (C1 to C3 and B1 to B3) that change the engaged state, it is only necessary to consider adjusting the engaged state of the hydraulic friction engagement mechanisms (C1 to C3 and B1 to B3) that change the engaged state. Therefore, it is possible to control the operating state of the automatic transmission (1) to a desired state while simplifying the switching control.

In the control device (100) of the automatic transmission (1) according to an embodiment of the disclosure, in the switching control, the control part may switch the multiple hydraulic friction engagement mechanisms (C1 to C3 and B1 to B3) from a third state corresponding to the non-traveling range to the first state or the second state when the detection part detects that the shift position has been switched to the forward range or the reverse range via the non-traveling range, and in the switching control, among the multiple hydraulic friction engagement mechanisms (C1 to C3 and B1 to B3), the hydraulic pressure command value for the hydraulic friction engagement mechanisms (C1 to C3 and B1 to B3) that do not change the engaged state between the non-traveling range and the forward range (1st to 10th) or the reverse range (RVS) may be set higher than the hydraulic pressure command value for the hydraulic friction engagement mechanisms (C1 to C3 and B1 to B3) that change the engaged state between the non-traveling range and the forward range (1st to 10th) or the reverse range (RVS). According to this, it is sufficient to consider adjusting the engaged state only for the hydraulic friction engagement mechanisms (C1 to C3 and B1 to B3) that change the engaged state between the non-traveling range and the forward range (1st to 10th) or the reverse range (RVS). Therefore, it is possible to reduce the number of factors to be considered in the switching control of the shift stages, thereby simplifying the switching control.

In the control device (100) of the automatic transmission (1) according to an embodiment of the disclosure, in the switching control, among the plurality of hydraulic friction engagement mechanisms (C1 to C3 and B1 to B3), the hydraulic pressure command value for the hydraulic friction engagement mechanisms (C1 to C3 and B1 to B3) that do not change the engaged state between the forward range (1st to 10th) and the reverse range (RVS) may be set lower than the hydraulic pressure command value for the hydraulic friction engagement mechanisms (C1 to C3 and B1 to B3) that change the engaged state between the forward range (1st to 10th) and the reverse range (RVS). According to this, for example, among the hydraulic friction engagement mechanisms (C1 to C3 and B1 to B3) that do not change the engaged state between the forward range (1st to 10th) and the reverse range (RVS), an appropriate hydraulic pressure command value can be set for those that do not transmit torque or those that do not primarily transmit torque.

In the control device (100) of the automatic transmission (1) according to an embodiment of the disclosure, the hydraulic pressure command value may be a reference pressure set for a hydraulic circuit that supplies hydraulic pressure to the hydraulic friction engagement mechanism (C1 to C3 and B1 to B3) in order to control the engaged state of the hydraulic friction engagement mechanism (C1 to C3 and B1 to B3). According to this, instead of adjusting the hydraulic pressure supplied to the hydraulic friction engagement mechanisms (C1 to C3 and B1 to B3) themselves, the preparatory pressure that may be used when controlling the engaged state of the hydraulic friction engagement mechanism (C1 to C3 and B1 to B3) is controlled. Therefore, it is possible to effectively suppress the generation of noise due to excessive supply of the preparatory pressure and the reduction in responsiveness due to insufficient supply of the preparatory pressure.

In the control device (100) of the automatic transmission (1) according to an embodiment of the disclosure, the shift position may be selected by a shifter in which the forward range, a neutral range, and the reverse range are disposed in this order. For example, the shifter applied to the automatic transmission (1) may be a dial-type shifter or a lever-type shifter with a forward range, a neutral range, and a reverse range disposed in that order. In such a shifter, the shift position is changed from the forward range to the reverse range via the neutral range, or conversely from the reverse range to the forward range via the neutral range. By executing the above-described switching control when the shift position passes through the neutral range in this way, it is possible to reduce the number of factors to be considered in the switching control of the shift stages while suppressing the reduction in responsiveness, thereby simplifying the switching control.

The reference numerals in parentheses above indicate the reference numerals of the components in the embodiments described later as examples of this disclosure, and are not intended to limit this disclosure to the aspects of the embodiments.

In this way, the control device of the automatic transmission according to this disclosure reduces the number of factors to be considered in the switching control of the shift stages, thereby simplifying the switching control.

Exemplary embodiments will be described below with reference to the drawings. In addition, the same reference numerals are given to the same or corresponding parts in each figure, and repeated descriptions are omitted.

[Automatic Transmission]

<Basic Configuration of Automatic Transmission>

Figure 1:
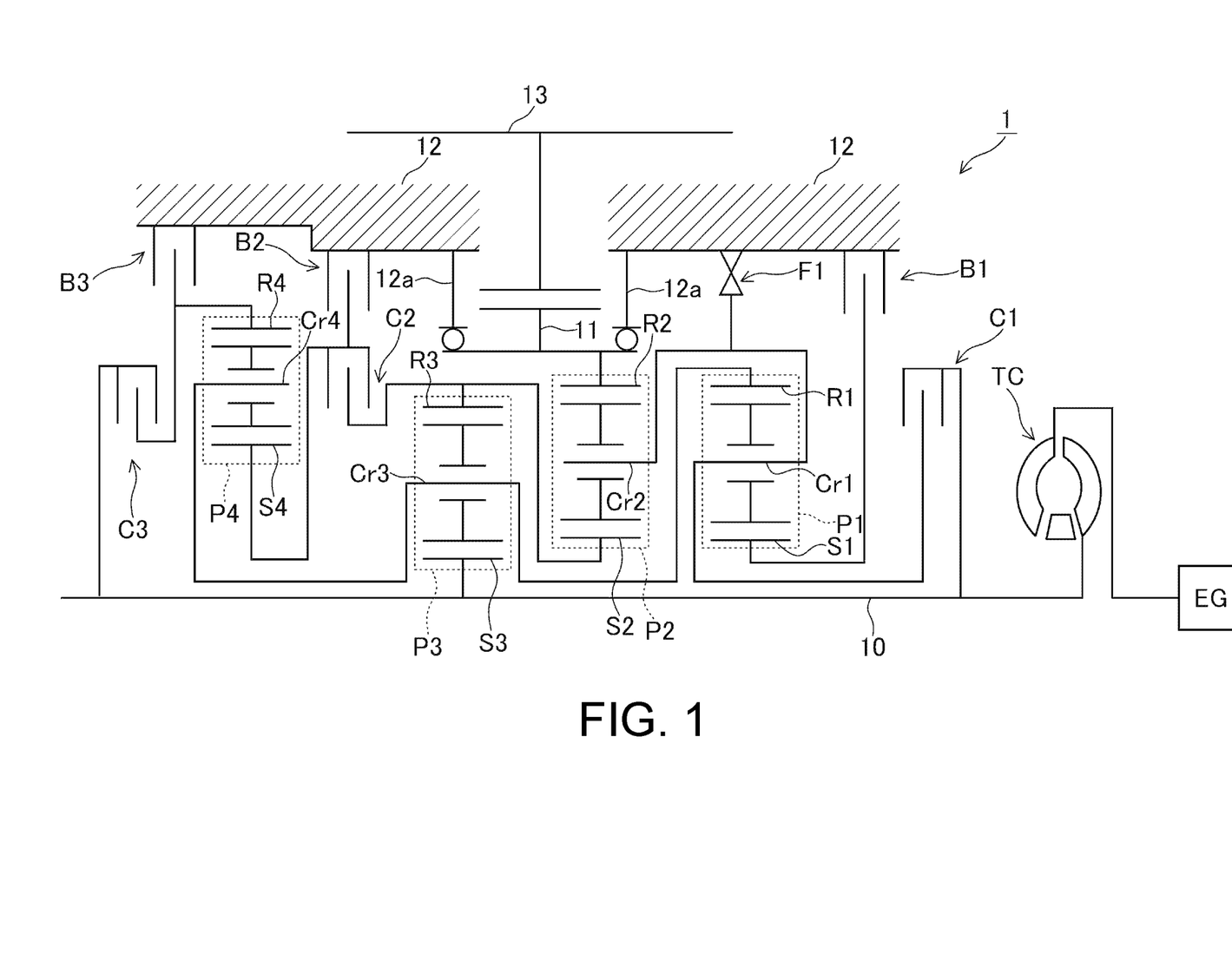
FIG. 1 is a skeleton diagram showing the basic configuration of an automatic transmission.

First, the basic configuration of an automatic transmission 1 including a control device 100 will be described below with reference to FIG. 1. FIG. 1 is a skeleton diagram showing the basic configuration of the automatic transmission 1, and the diagram shows the upper half of the automatic transmission 1 from its axis. The automatic transmission 1 is, for example, a vehicle automatic transmission used for a vehicle.

The illustrated automatic transmission 1 includes an input shaft 10 rotatably supported in a casing 12 configuring a transmission case, and an output member 11 and an output shaft 13 which are rotatably disposed coaxially with the input shaft 10. Here, the output member 11 is rotatably supported by a support member 12a supported by the casing 12.

The input shaft 10 receives a drive force from an engine EG, which is a drive source, and a torque converter TC is provided between the input shaft 10 and the engine EG as a fluid coupling type starting device. Therefore, the drive force from the engine EG is transmitted to the input shaft 10 via the torque converter TC, and this drive force drives the input shaft 10 to rotate at a predetermined speed.

The output member 11 for outputting the drive force from the input shaft 10 and the output shaft 13 are provided with gears concentric with the input shaft 10, respectively. By meshing these gears, the rotation of the input shaft 10 is changed in speed by a transmission mechanism described below and transmitted to the output shaft 13 via the output member 11. The rotation of the output shaft 13 is transmitted to left and right axles (not shown) via, for example, a differential mechanism (not shown), and drive wheels (not shown) attached to the respective axles are rotationally driven. Thus, the vehicle travels at a predetermined speed.

By the way, the automatic transmission 1 includes four planetary gear mechanisms P1, P2, P3 and P4 as transmission mechanisms, and three clutches C1, C2 and C3, three brakes B1, B2 and B3 and one mechanical engagement mechanism F1 as engagement mechanisms. Here, in this embodiment, the four planetary gear mechanisms P1 to P4 all adopt a single pinion type, and the rotation of the input shaft 10 is changed in speed by these planetary gear mechanisms P1 to P4, and is transmitted to the output member 11.

That is, the clutches C1 to C3, the brakes B1 to B3, and the mechanical engagement mechanism F1, which configure the engagement mechanism, switch the transmission path of the drive force in the planetary gear mechanisms P1 to P4 to provide multiple shift stages (10 forward stages and 1 reverse stage in this embodiment).

Here, the four planetary gear mechanisms P1 to P4 include sun gears S1 to S4, ring gears R1 to R4, carriers Cr1 to Cr4, which rotatably support the pinion gears (planetary gears) that mesh with the sun gears S1 to S4 and the ring gears R1 to R4, respectively, as multiple (12 in total) rotating elements, and the rotating elements are disposed coaxially with the input shaft 10.

Figure 4:
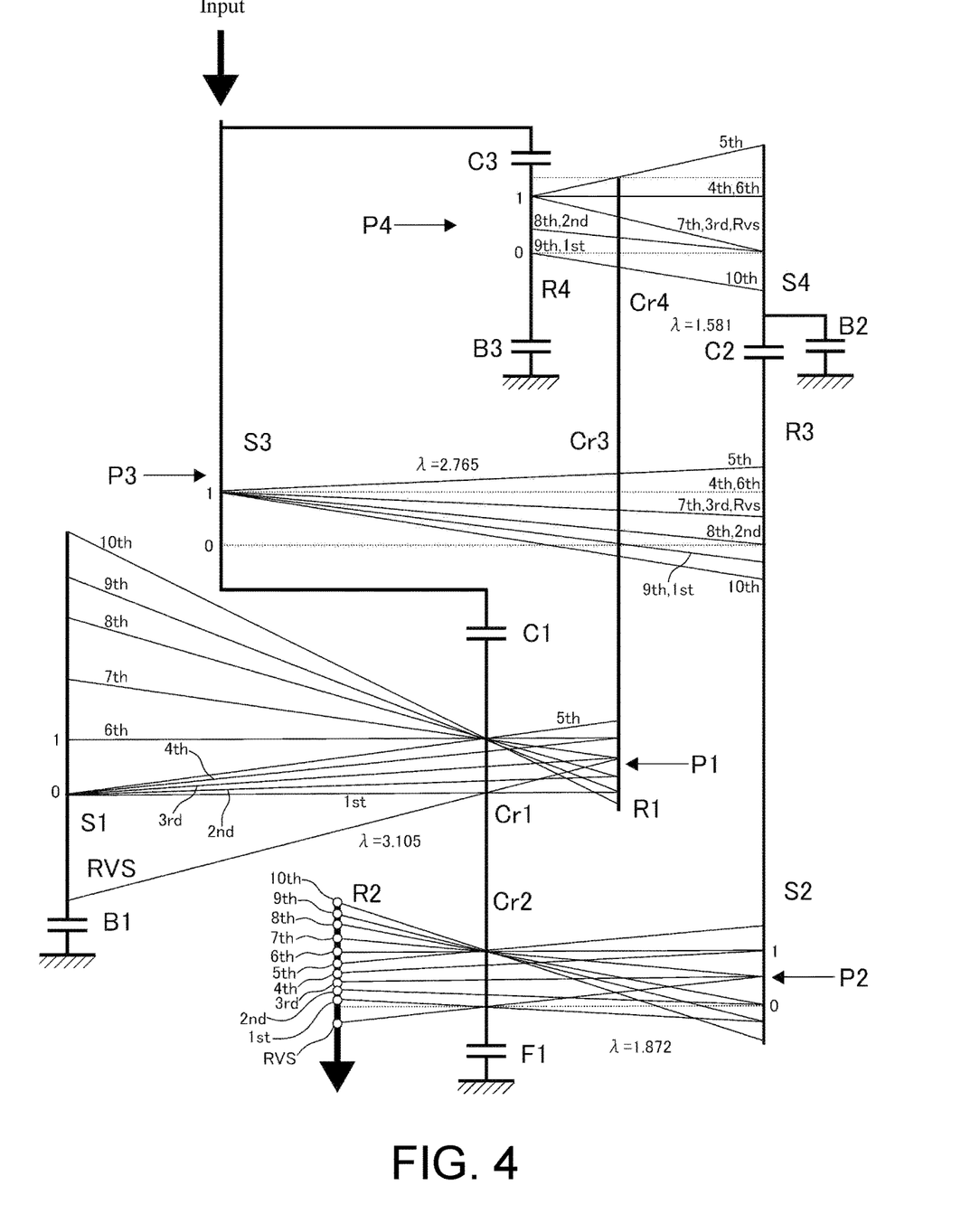
FIG. 4 is a collinear diagram (velocity diagram) of the automatic transmission.

If they are arranged in order of intervals corresponding to the gear ratios in the collinear diagram (velocity diagram) of FIG. 4, the sun gear S1, the carrier Cr1, and the ring gear R1 of the planetary gear mechanism P1 may be referred to in this order as the "first rotating element," the "second rotating element," and the "third rotating element." Similarly, the ring gear R2, the carrier Cr2 and the sun gear S2 of the planetary gear mechanism P2 may be referred to in this order as the "fourth rotating element," the "fifth rotating element," and the "sixth rotating element;" and the sun gear S3, the carrier Cr3, and the ring gear R3 of the planetary gear mechanism P3 may be referred to in this order as the "seventh rotating element," the "eighth rotating element," and the "ninth rotating element." Further, the sun gear R4, the carrier Cr4, and the ring gear S4 of the planetary gear mechanism P4 may be referred to in this order as the "tenth rotating element," the "eleventh rotating element," and the "twelfth rotating element."

By the way, by switching the engaged state of each of the three clutches C1 to C3 and the brakes B1 to B3 that configure the engagement mechanisms (that is, the state in which each element is engaged [connected state] or the state in which each element is not engaged [disengaged state or released state]) and switching the state of the mechanical engagement mechanism F1, the power transmission path from the input shaft 10 to the output member 11 is switched to establish multiple shift stages. In this embodiment, the clutches C1 to C3 and the brakes B1 to B3 all use hydraulic friction engagement mechanisms. A dry or wet single-plate or multiple-plate clutch or single-plate or multiple-plate brake is used as the hydraulic friction engagement mechanism. In other words, the automatic transmission 1 includes multiple planetary gear mechanisms P1 to P4 that transmit the drive force input from the input shaft 10 to the output member 11, and multiple hydraulic friction engagement mechanisms (clutches C1 to C3 and brakes B1 to B3) capable of establishing multiple shift stages by switching transmission paths of drive force in multiple planetary gear mechanisms P1 to P4.

Further, the mechanical engagement mechanism F1 is provided between a predetermined rotating element (carriers Cr1 and Cr2 connected to each other in this embodiment) and the casing 12. This mechanical engagement mechanism F1 is switchable between a "one-way rotation permitting state" (one-way clutch [OWC] state) that restricts rotation of a predetermined rotating element (carriers Cr1 and Cr2) only in one direction and permits rotation in the opposite direction, and a "rotation blocking state" (two-way clutch [TWC] state) that restricts rotation in both directions.

Here, the above-mentioned "one-way rotation permitting state" is a state having the same function as a so-called one-way clutch (OWC), which is a state in which drive is transmitted in one direction of rotation and idling is performed in the other direction. In this embodiment, the mechanical engagement mechanism F1 functions as a brake, and hence the mechanical engagement mechanism F1 is hereinafter referred to as the "brake F1." When the brake F1 is in the "one-way rotation permitting state," only one-directional rotation of the predetermined rotating element (carriers Cr1 and Cr2) is permitted.

Further, the "rotation blocking state" is a state in which drive transmission is performed in both directions of rotation. In this embodiment, the brake F1 functions as a brake, and when the brake F1 is in the "rotation blocking state," the predetermined rotating element (carriers Cr1 and Cr2) is in a locked state preventing rotation in both directions.

A known two-way clutch (TWC), for example, may be employed as the brake F1. Here, as a known two-way clutch, there may be one capable of switching to any one of "one-way rotation permitting state," "two-way rotation blocking state" and "two-way rotation permitting state" by drive control of hydraulic actuators and electromagnetic actuators. Further, there may be one capable of further switching the "one-way rotation permitting state" between the "forward rotation permitting state" and the "reverse rotation permitting state." In this embodiment, it is sufficient to switch between the "one-way rotation permitting state" and the "two-way rotation blocking state," and it is sufficient that the "one-way rotation permitting state" is a permitting state that allows only one rotation direction. However, a two-way clutch that may select other states such as "two-way rotation permitting state" may be used.

<Connection Relationship Between Each Component>

Here, the connection relationship between each component in the automatic transmission 1 will be described with reference to FIG. 1.

The sun gear S3 of the planetary gear mechanism P3 is connected to the input shaft 10, and the carrier Cr3 is connected to the ring gear R1 of the planetary gear mechanism P1 and the carrier Cr4 of the planetary gear mechanism P4. Further, the carrier Cr2 of the planetary gear mechanism P2 is connected to the carrier Cr1 of the planetary gear mechanism P1, and the ring gear R2 is connected to the output member 11. Therefore, the planetary gear mechanism P2 functions to output drive force to the output shaft 13.

The clutch C1 connects the input shaft 10, the carrier Cr1 of the planetary gear mechanism P1, and the carrier Cr2 of the planetary gear mechanism P2 in the connected state, and disconnects the carriers Cr1 and Cr2 in the released state. The clutch C2 connects the ring gear R3 of the planetary gear mechanism P3 and the sun gear S4 of the planetary gear mechanism P4 in the connected state, and disconnects the ring gear R3 and the sun gear S4 in the released state. The clutch C3 connects the input shaft 10 and the ring gear R4 of the planetary gear mechanism P4 in the connected state, and disconnects the input shaft 10 and the ring gear R4 in the released state.

The brake B1 connects the casing 12 and the sun gear S1 of the planetary gear mechanism P1 in the connected state, and disconnects the casing 12 and the sun gear S1 in the released state. Further, the brake B2 connects the casing 12 and the sun gear S4 of the planetary gear mechanism P4 in the connected state, and disconnects the casing 12 and the sun gear S4 in the released state. The brake B3 connects the casing 12 and the ring gear R4 of the planetary gear mechanism P4 in the connected state, and disconnects the casing 12 and the ring gear R4 in the released state.

As described above, when the brake F1 is in the "one-way rotation permitting state," the brake F1 restricts only one-way rotation of the carrier Cr2 of the planetary gear mechanism P2 (and the carrier Cr1 connected thereto); when the brake F1 is in the "two-way rotation blocking state," the carrier Cr2 of the planetary gear mechanism P2 (and the carrier Cr1 connected thereto) is fixed to the casing 12.

<Operation of Automatic Transmission>

Here, the operation of the automatic transmission 1 according to this embodiment will be described below with reference to FIGS. 2 to 4.

Figure 2:
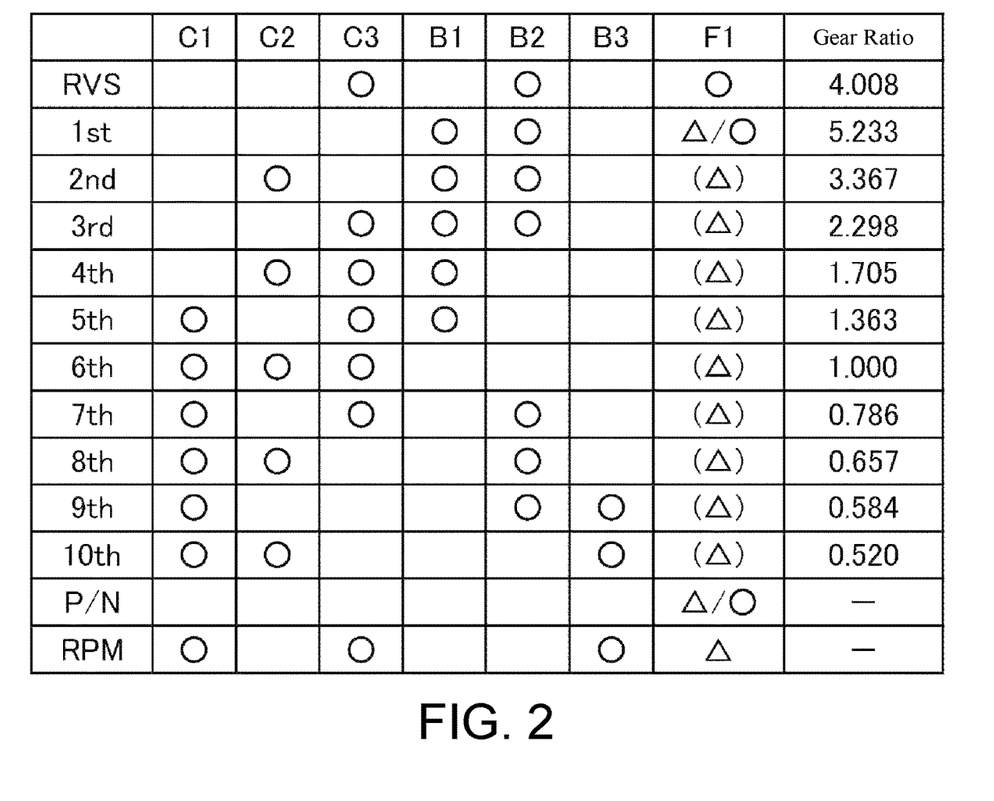
FIG. 2 is a diagram showing an engagement table of an engagement mechanism in the automatic transmission.
Figure 3:
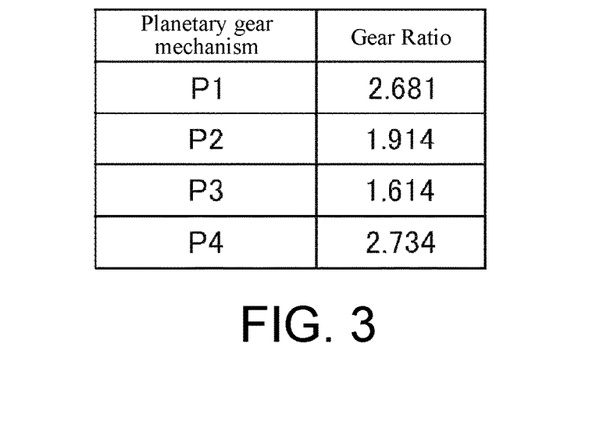
FIG. 3 is a diagram showing gear ratios of planetary gear mechanisms of the automatic transmission.

FIG. 2 shows an engagement table of each engagement mechanism C1 to C3, B1 to B3 and F1 of the automatic transmission 1. FIG. 3 is a diagram showing gear ratios each planetary gear mechanism P1 to P4 of the automatic transmission 1. FIG. 4 is a collinear diagram (velocity diagram) of the automatic transmission 1. Further, the "gear ratio" in FIG. 2 indicates the gear ratio between the input shaft 10 and the output member 11.

In the automatic transmission 1 according to this embodiment, ten forward ranges (1st to 10th) and one reverse range (RVS) as well as states corresponding to the non-traveling range may be established. In addition, "P/N" in FIG. 2 indicates a non-traveling range; "P" indicates a parking range, and "N" indicates a neutral range. In addition, "RPM" indicates a combination of engagement of the clutches C1 to C3, the brakes B1 to B3, and the brake F1 in a reverse preparation process (hereinafter referred to as the "RVS preparation process"), which will be described later, and the brake F1 is switched from the "one-way rotation permitting state (OWC)" to the "two-way rotation blocking state (TWC)."

In the operation table shown in FIG. 2, "○" indicates the connected state, and no mark indicates the released state. In addition, although it is not essential for the shift stage, the operation table includes an engagement mechanism that is in the connected state (indicated by "○") in order to smoothly shift to the adjacent shift stage. For example, in the case of the first shift stage (1st), the engagement of the brake B2 is not essential, but when shifting to the reverse range (RVS) or the second reverse range (2nd), the connected state is used for the purpose of reducing the number of engagement mechanisms that switch the engaged state. Similarly, in the case of the fifth shift stage (5th), the engagement of the clutch C3 is not essential, but when shifting to the fourth shift stage (4th) or the sixth shift stage (6th), the connected state is used for the purpose of reducing the number of engagement mechanisms that switch the engaged state.

As for the brake F1, "○" indicates that it is in a two-way rotation blocking state, and "Δ" indicates that it is in a one-way rotation permitting state. In the case of the first shift stage (1st), the brake F1 may be in either the two-way rotation blocking state or the one-way rotation permitting state; in the case of the two-way rotation blocking state, the engine braking is enabled, and in the case of the one-way rotation permitting state, the engine braking is disabled. The algorithm for determining which state the brake F1 should be in in the case of the first shift stage (1st) may be appropriately designed. For example, the state before shifting to the first shift stage (1st) may be continued. Specifically, when shifting from the reverse range (RVS) to the first shift stage (1st), the first shift stage (1st) remains in the two-way rotation blocking state. However, when the vehicle speed exceeds a predetermined speed, the state may be switched to the one-way rotation permitting state. Similarly, when shifting from another forward range (2nd to 10th) to the first shift stage (1st), the first shift stage (1st) remains in the one-way rotation permitting state.

Even in the non-traveling range (P/N), the state of the brake F1 may be either the two-way rotation blocking state or the one-way rotation permitting state. Therefore, as with the first shift stage (1st), the state before shifting to the non-traveling range (P/N) may be continued.

In the second shift stage (2nd) to the tenth shift stage (10th), the brake F1 is in the one-way rotation permitting state, but due to the structure of the automatic transmission 1, it is in an idle state. Therefore, in the operation table shown in FIG. 2, the state of the brake F1 is displayed as "(Δ)." If the brake F1 is capable of selecting the two-way rotation permitting state, it is also possible for the brake F1 to be in the two-way rotation permitting state in the second shift stage (2nd) to the tenth shift stage (10th).

In this embodiment, a configuration is adopted in which the one-way rotation permitting state is selected as the state of the brake F1 in any of the second shift stage (2nd) to the tenth shift stage (10th); however, depending on the configuration of the automatic transmission 1, a configuration in which the two-way rotation blocking state is selected may also be adopted.

The velocity diagram (collinear diagram) shown in FIG. 4 shows the rotation speed ratio of each element in each shift stage with respect to the input to the input shaft 10. The vertical axis in FIG. 4 indicates the speed ratio, with a speed ratio of "1" indicating the same speed as the input shaft 10, and a speed ratio of "0" indicating a stopped state. The horizontal axis indicates the gear ratio between the rotating elements of the planetary gear mechanisms P1 to P4, and "k" in the figure indicates the gear ratio between the carrier Cr and the sun gear S. In addition, elements corresponding to the output shaft 13 are omitted from FIG. 4.

<Configuration of Shifter>

For example, when a shifter provided in the driver's seat is operated, the automatic transmission 1 performs control according to the operation by the control device 100. The shifter is configured so that one of multiple shift positions may be selected. Specifically, the shift position is selected by the shifter in which a forward range, a neutral range, and a reverse range are disposed in this order. For example, the shifter may be a dial-type shifter or a lever-type shifter with a forward range, a neutral range, and a reverse range disposed in that order. In such a shifter, the shift position is changed from the forward range to the reverse range via the neutral range, or conversely from the reverse range to the forward range via the neutral range.

[Control Device for Automatic Transmission]

Next, the control device 100 of the automatic transmission 1 will be described.

<Basic Configuration of Control Device>

Figure 5:
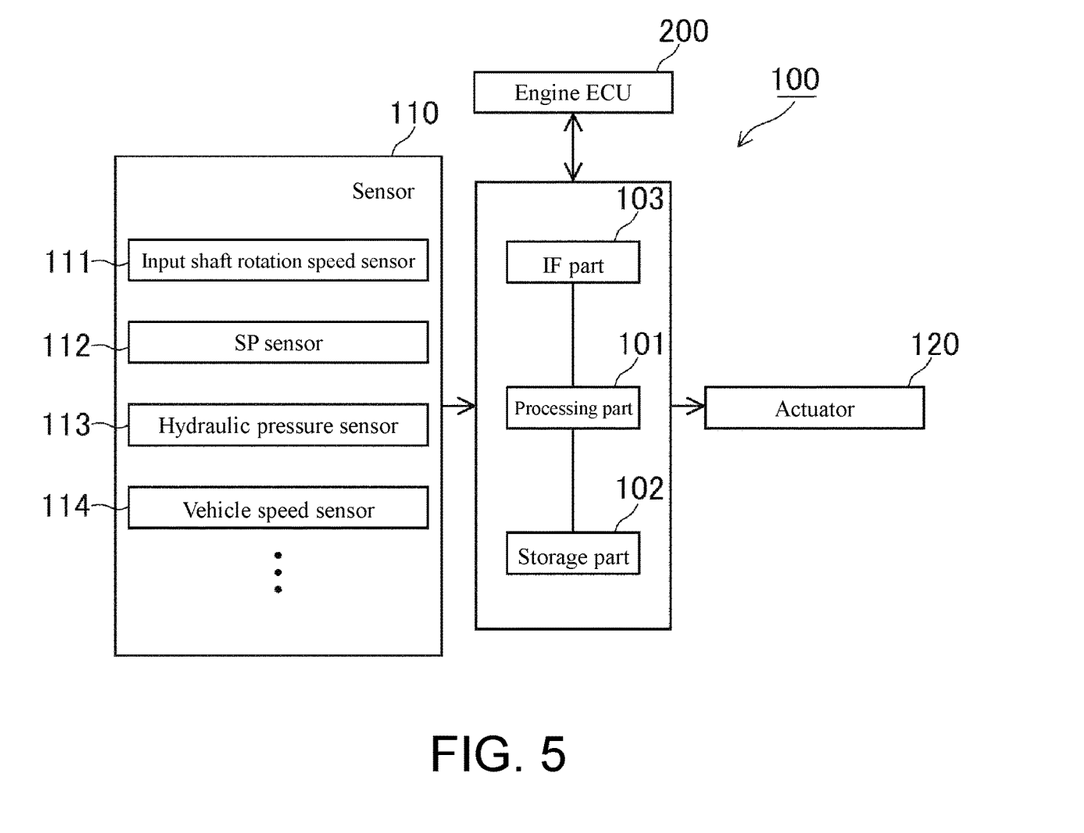
FIG. 5 is a block diagram showing the configuration of the control device.

FIG. 5 is a block diagram showing the basic configuration of the control device 100 of the automatic transmission 1. The shown control device 100 may control not only the automatic transmission 1 but also the engine EG and the torque converter TC (see FIG. 1). In this embodiment, engine EG is controlled by an engine ECU 200 provided separately from the control device 100. In this case, the control device 100 may receive various information about the engine EG and the vehicle from the engine ECU 200 and may transmit information about the automatic transmission 1 to the engine ECU 200.

The control device 100 includes a processing part 101 such as a CPU, a storage part 102 having RAM, ROM, and the like, and an IF part 103 that interfaces the processing part 101 with an external device or the engine ECU 200. Here, the IF part 103 is configured by, for example, a communication interface, an input/output interface, and the like.

The processing part 101 executes various programs stored in the storage part 102 and drives and controls various actuators 120 based on the detection results of various sensors 110. In other words, the processing part 101 functions as a part for acquiring the detection results of various sensors 110, and as an example, functions as a detection part for detecting the shift position by acquiring information on the shift position of the shifter from an SP sensor (shift position sensor) 112, which will be described later. The processing part 101 also functions as a control part for controlling multiple hydraulic friction engagement mechanisms (clutches C1 to C3 and brakes B1 to B3).

The various sensors 110 include various sensors provided in the automatic transmission 1, and examples of the various sensors include an input shaft rotation speed sensor 111, an SP sensor 112, a hydraulic pressure sensor 113, a vehicle speed sensor 114, and the like.

The input shaft rotation speed sensor 111 is a sensor that detects the rotation speed of the input shaft 10 (see FIG. 1), and the SP sensor 112 is a sensor that detects the shift position selected by the driver using the shifter. Here, as shift positions, four ranges including a P range (parking range), a D range (forward range), an N range (neutral range), and an R range (reverse range) are set. Among these ranges, the P range and the N range are defined as the non-traveling range (P/N). When the driver selects the D range, the processing part 101 selects any one of the first shift stage (1st) to the tenth shift stage (10th) according to the vehicle speed map stored in the storage part 102. Further, when the R range is selected, the processing part 101 selects the reverse range (RVS). In addition, as a name corresponding to the shift stages such as the first shift stage (1st) to tenth shift stage (10th) and reverse range (RVS), the engaged state of each element of the automatic transmission 1 when the shift position of the shifter is in the non-traveling range (P/N) is also referred to as the non-traveling range state or simply the non-traveling range.

The hydraulic pressure sensor 113 detects the hydraulic pressure of each hydraulic oil supplied to the clutches C1 to C3 and the brakes B1 to B3, and the vehicle speed sensor 114 detects the traveling speed (vehicle speed) of the vehicle equipped with the automatic transmission 1.

The various actuators 120 driven and controlled by the processing part 101 include electromagnetic actuators such as electromagnetic solenoids for switching the operation states of the clutches C1 to C3 and the brakes B1 to B3 and the brake F1 provided in the automatic transmission 1.

Figure 6:
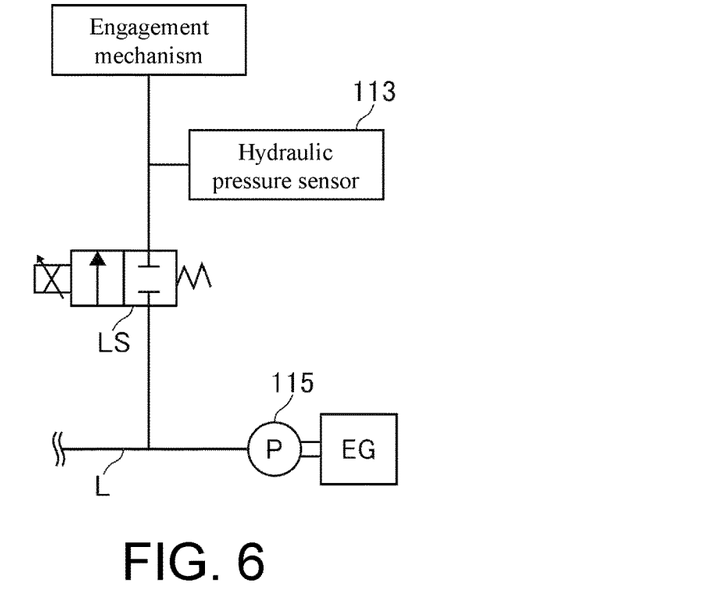
FIG. 6 is a diagram showing a disposition example of the hydraulic pressure sensor.

FIG. 6 shows a disposition example of the hydraulic pressure sensor 113. The hydraulic oil sensor 113 may be provided for each of the clutches C1 to C3, the brakes B1 to B3 and the brake F1. This makes it possible to detect the hydraulic pressure of the hydraulic oil supplied to each of the clutches C1 to C3, the brakes B1 to B3 and the brake F1. Further, the hydraulic pressure sensor 113 does not necessarily have to be provided for each of the clutches C1 to C3 and the brakes B1 to B3.

Incidentally, as shown in FIG. 6, an electromagnetic valve LS and the hydraulic pressure sensor 113 are provided in a hydraulic oil supply line L from an oil pump 115 driven by the engine EG to the engagement mechanisms (clutches C1 to C3 and brakes B1 to B3). Here, the electromagnetic valve LS functions to switch between engagement and disengagement of the engagement mechanisms (clutches C1 to C3 and brakes B1 to B3) by opening or shutting off the hydraulic oil supply line L.

The engaged states of the multiple hydraulic friction engagement mechanisms (clutches C1 to C3 and brakes B1 to B3) are controlled by hydraulic pressure command values set in a hydraulic circuit. The hydraulic pressure command value is a reference pressure set for the hydraulic circuit that supplies hydraulic pressure to each hydraulic friction engagement mechanism (clutches C1 to C3 and brakes B1 to B3) in order to control the engaged state of each hydraulic friction engagement mechanism (clutches C1 to C3 and brakes B1 to B3). When the automatic transmission 1 performs control by engaging multiple hydraulic friction engagement mechanisms (clutches C1 to C3 and brakes B1 to B3), the automatic transmission 1 is configured such that the operating state of the automatic transmission 1 is determined by the engaged state of the hydraulic friction engagement mechanisms (clutches C1 to C3 and brakes B1 to B3) with the lowest hydraulic command pressure.

<Brake Switching Control for Switching the Brake F1>

In the automatic transmission 1 according to this embodiment, the brake F1 is in the rotation blocking state when the reverse range (RVS) is selected. When switching from the forward range (D range) or the non-traveling range (P/N range) to the reverse range (RVS), the brake F1 may switch from the one-way rotation permitting state (OWC) to the two-way rotation blocked state (TWC). At this time, in order to suppress the occurrence of noise and vibration, it is desirable that the differential rotation between the casing 12 side and the carrier Cr2 side of the brake F1 is zero. That is, it is desirable that the rotation speed of the carrier Cr2 is zero.

Therefore, it is necessary to pass through a combination of engagement mechanisms in which the rotation speed of the carrier Cr2 is zero. In this embodiment, since no sensor is provided to directly measure the rotation speed of the carrier Cr2, the carrier Cr2 and the input shaft 10 are connected to each other, and it is confirmed that the rotation speed of the carrier Cr2 is 0 from the detection result of the input shaft rotation speed sensor 111 (see FIG. 5). After that, the brake F1 is switched to the two-way rotation blocking state (locked state).

Figure 7:
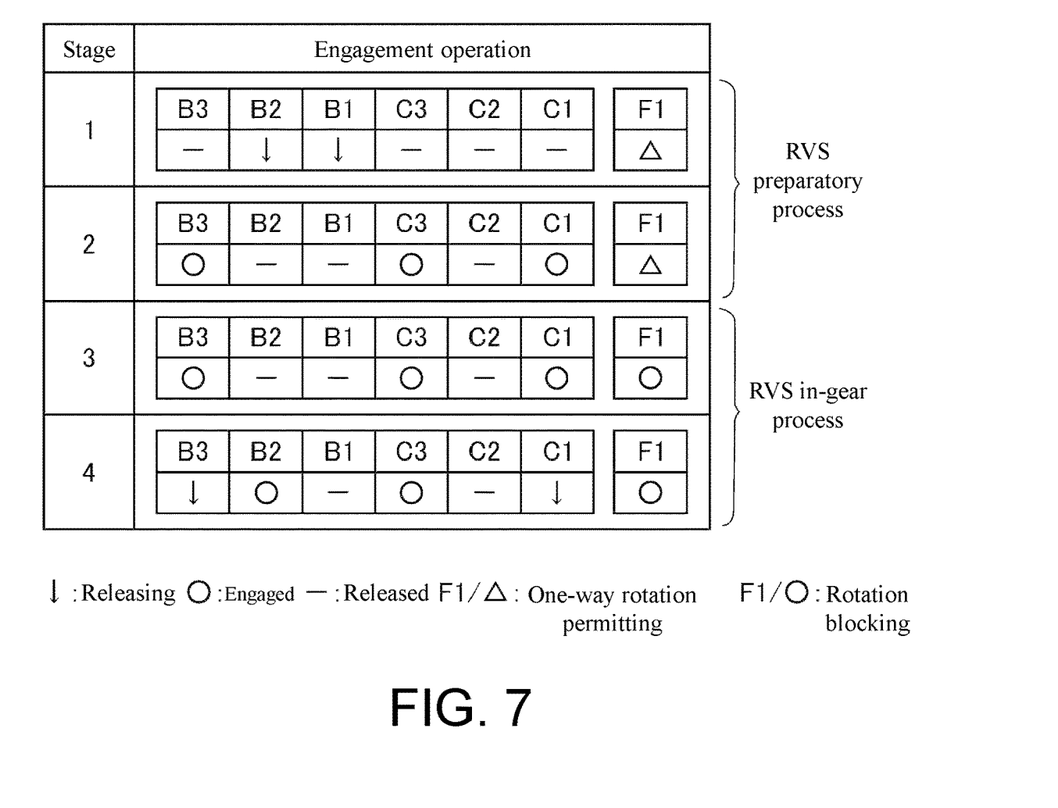
FIG. 7 is a diagram showing the engagement operation of each engagement mechanism when a reverse range is selected.

FIG. 7 is a diagram showing the engagement combination of the engagement mechanisms (clutches C1 to C3 and brakes B1 to B3) when switching the shift stage from the first forward shift stage (1st) to the tenth forward shift stage (10th) and the reverse range (RVS). Here, when the shift stage is the first forward shift stage (1st), as shown in FIG. 2, the brakes B1 and B2 are in the engaged state (indicated by "○" in FIG. 7). At this time, it is assumed that the brake F1 is in the one-way rotation permitting state (indicated by "Δ" in FIG. 7).

First, as shown in stage 1 of FIG. 7, the brakes B1 and B2 are controlled to be in the released state (indicated by "1"). When the brakes B1 and B2 start to be released, the process proceeds to the next stage 2.

In stage 2, the clutches C1 and C3 and the brake B3 are engaged. At this time, since the ring gear R2 and the output shaft 13 are rotatable, the drive wheels (not shown) are also rotatable. This prevents the vehicle from exhibiting unexpected behavior.

As is clear from the velocity diagram (collinear diagram) shown in FIG. 4, the input shaft is fixed to the casing 12 by engaging the clutch C3 and the brake B3. Further, the carrier Cr2 is connected to the input shaft 10 by engaging the clutch C1. In addition, stage 1 and stage 2 may be performed in parallel. Specifically, while performing control to release the brakes B1 and B2, control is performed to engage the clutches C1 and C3 and the brake B3. By doing so, it is possible to improve the responsiveness when switching the shift stage to the reverse range (RVS).

Through stages 1 and 2 described above, the RVS preparatory process for stopping the rotation of the input shaft 10 by engaging the clutches C1 and C3 and the brake B3 is executed. After this RVS preparatory process is executed, if a predetermined condition is satisfied, the process proceeds to the next stage 3. Here, the predetermined condition is a condition that it is confirmed that the rotation speed of the carrier Cr2 is 0 or a small value close to 0. Specifically, the predetermined condition is that the engagement of the clutch C1 is completed and that the detection result of the input shaft rotation speed sensor 111<predetermined value (for example, a value that may be regarded as 0) is satisfied. The completion of the engagement of the clutch C1 is determined, for example, by the fact that the detection result of the hydraulic pressure sensor 113 for the clutch C1 indicates a predetermined value or the control amount for the electromagnetic valve LS for the clutch C1 has reached a predetermined value. The completion of engagement of other engagement mechanisms may also be determined by a similar determination method.

In step 3, the brake F1 is switched from the one-way rotation permitting state to the two-way rotation blocking state (locked state). At this time, since the differential rotation between the casing 12 side and the carrier Cr2 side of the brake F1 is 0 or a value close to it, abnormal noise and vibration may be prevented. Then, when the switching of the brake F1 is completed, the process proceeds to stage 4. In stage 4, the clutch C1 and the brake B3 are released, and the brake B2 is engaged.

Through stages 3 and 4 described above, the brake F1 is switched to the two-way rotation blocking state (locked state), and the process of switching the shift stage to the reverse range (RVS) (hereinafter referred to as "RVS in-gear process") is executed, and the vehicle starts to travel backward.

<Forward/Reverse Switching Control>

As described above, in the automatic transmission 1, ten forward ranges (1st to 10th) and one reverse range (RVS), and a state corresponding to the non-traveling range (P/N) (this state is also simply referred to as the non-traveling range) may be established. More specifically, the multiple shift stages established in the automatic transmission 1 include at least one forward shift stage (here, ten forward shift stages) that may be established when the multiple hydraulic friction engagement mechanisms are in a first state (clutches C1 to C3 and brakes B1 to B3); a reverse range established when the multiple hydraulic friction engagement mechanisms (clutches C1 to C3 and brakes B1 to B3) are in a second state; and a non-traveling range (P/N) established when the multiple hydraulic friction engagement mechanisms (clutches C1 to C3 and brakes B1 to B3) are in a third state (see FIG. 2). The non-traveling range includes at least one of the N range (neutral range) established when the neutral range is selected as the shift position and the P range (parking range) established when the parking range is selected as the shift position, and here, the N range is exemplified as the non-traveling range.

The forward/reverse switching control is a control that is executed when switching multiple hydraulic friction engagement mechanisms (clutches C1 to C3 and brakes B1 to B3) from one of the first state and the second state to the other when the SP sensor 112 detects that the shift position has been switched from one of the forward range and the reverse range to the other. Specifically, in the forward/reverse switching control is a control that is executed when switching the multiple hydraulic friction engagement mechanisms (clutches C1 to C3 and brakes B1 to B3) from the first state to the second state when the shift position is switched from the forward range to the reverse range. Further, the forward/reverse switching control is a control that is executed when switching the multiple hydraulic friction engagement mechanisms (clutches C1 to C3 and brakes B1 to B3) from the second state to the first state when the shift position is switched from the reverse range to the forward range. Here, a case in which the shift position is switched from the forward range to the reverse range will be described as an example.

Switching the shift position from the forward range to the reverse range may mean, for example, that the shift position is switched from the forward range to the reverse range via the non-traveling range, and may mean that the shift position is directly switched from the forward range to the reverse range (i.e., without going through the non-traveling range). Here, a case in which the shift position is switched from the forward range to the reverse range via the non-traveling range will be described as an example. Further, switching the shift position from the forward range to the reverse range may mean, for example, that the shift position is switched from the forward range to the reverse range via the non-traveling range, then returned to the non-traveling range, and then switched to the reverse range again.

In the forward/reverse switching control, among multiple hydraulic friction engagement mechanisms (clutches C1 to C3 and brakes B1 to B3), the hydraulic pressure command value is fixed for the hydraulic friction engagement mechanisms (clutches C1 to C3 and brakes B1 to B3) that do not change the engaged state between the forward range and the reverse range. That is, in the forward/reverse switching control, the hydraulic pressure command value is fixed for the hydraulic friction engagement mechanisms (clutches C1 to C3 and brakes B1 to B3) that are engaged in the forward range and engaged in the reverse range. Similarly, in the forward/reverse switching control, the hydraulic pressure command value is fixed for the hydraulic friction engagement mechanisms (clutches C1 to C3 and brakes B1 to B3) that are released in the forward range and released in the reverse range.

In addition, in the forward/reverse switching control, among the multiple hydraulic friction engagement mechanisms (clutches C1 to C3 and brakes B1 to B3), the hydraulic pressure command value is variable based on the hydraulic pressure (that is, residual pressure) supplied to the hydraulic friction engagement mechanisms (clutches C1 to C3 and brakes B1 to B3) for the hydraulic friction engagement mechanisms (clutches C1 to C3 and brakes B1 to B3) that change the engaged state between the forward range and the reverse range. That is, in the forward/reverse switching control, the hydraulic pressure command value is variable based on the hydraulic pressure supplied to the hydraulic friction engagement mechanisms (clutches C1 to C3 and brakes B1 to B3) for the hydraulic friction engagement mechanisms (clutches C1 to C3 and brakes B1 to B3) that are engaged in the forward range and released in the reverse range. Similarly, in the forward/reverse switching control, the hydraulic pressure command value is variable based on the hydraulic pressure supplied to the hydraulic friction engagement mechanisms (clutches C1 to C3 and brakes B1 to B3) for the hydraulic friction engagement mechanisms (clutches C1 to C3 and brakes B1 to B3) that are released in the forward range and engaged in the reverse range.

More specifically, in the forward/reverse switching control, among the multiple hydraulic friction engagement mechanisms (clutches C1 to C3 and brakes B1 to B3), the hydraulic pressure command value is set lower when the hydraulic pressure supplied to the hydraulic friction engagement mechanisms (clutches C1 to C3 and brakes B1 to B3) is high than when the hydraulic pressure is low, for the hydraulic friction engagement mechanisms (clutches C1 to C3 and brakes B1 to B3) that change the engaged state between the forward range and the reverse range. This prevents the hydraulic pressure (actual pressure) actually supplied to the hydraulic friction engagement mechanisms (clutches C1 to C3 and brakes B1 to B3) from becoming too large.

Further, in the forward/reverse switching control, among the multiple hydraulic friction engagement mechanisms (clutches C1 to C3 and brakes B1 to B3), the hydraulic pressure command value (fixed value) for the hydraulic friction engagement mechanisms (clutches C1 to C3 and brakes B1 to B3) that do not change the engaged state between the forward range and the reverse range is set higher than the hydraulic pressure command value for the hydraulic friction engagement mechanisms (clutches C1 to C3 and brakes B1 to B3) that change the engaged state between the forward range and the reverse range. In other words, in the forward/reverse switching control, when the engaged state changes between the forward range and the reverse range, the hydraulic pressure command value for the hydraulic friction engagement mechanisms (clutches C1 to C3 and brakes B1 to B3) is decreased.

Furthermore, in the forward/reverse switching control, the control device 100 may switch the multiple hydraulic friction engagement mechanisms (clutches C1 to C3 and brakes B1 to B3) from the third state corresponding to the non-traveling range to the second state when the SP sensor 112 detects that the shift position has been switched to the reverse range (from forward range) via the non-traveling range. At this time, in the forward/reverse switching control, among the multiple hydraulic friction engagement mechanisms (clutches C1 to C3 and brakes B1 to B3), the hydraulic pressure command value for the hydraulic friction engagement mechanisms (clutches C1 to C3 and brakes B1 to B3) that do not change the engaged state between the non-traveling range and the reverse range is set higher than the hydraulic pressure command value for the hydraulic friction engagement mechanisms (clutches C1 to C3 and brakes B1 to B3) that change the engaged state between the non-traveling range and the reverse range.

Figure 8:
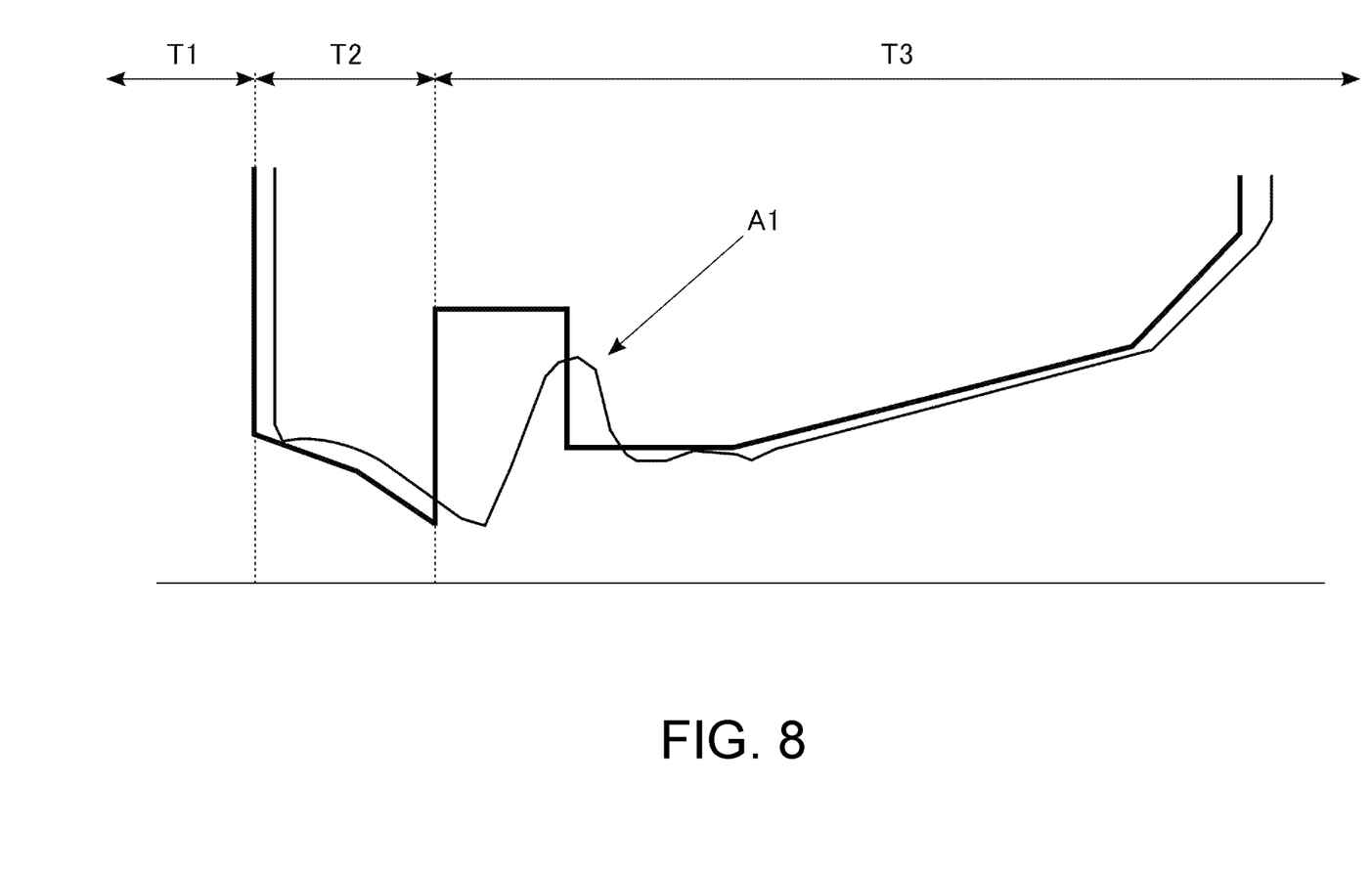
FIG. 8 is a diagram showing a hydraulic pressure command value and an actual hydraulic pressure when switching control from a forward range to a reverse range is not executed by the control device of the automatic transmission.
Figure 9:
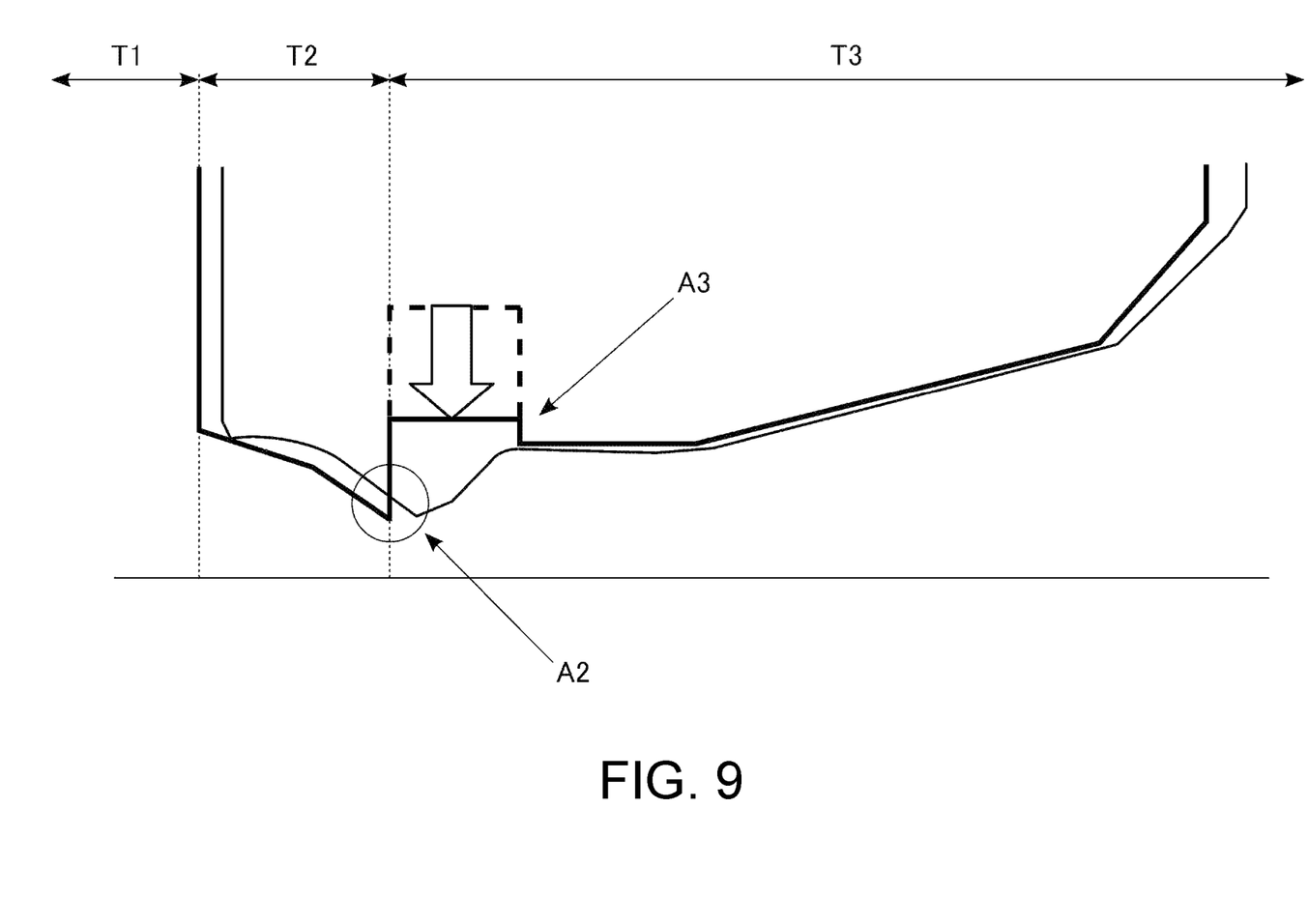
FIG. 9 is a diagram showing a hydraulic pressure command value and an actual hydraulic pressure when switching control from a forward range to a reverse range is executed by the control device of the automatic transmission.

The above switching control will be described with reference to FIGS. 8 and 9. FIG. 8 is a diagram showing a hydraulic pressure command value and an actual hydraulic pressure when switching control from a forward range (1st to 10th) to a reverse range (RVS) is not executed by the control device 100 of the automatic transmission 1. FIG. 9 is a diagram showing a hydraulic pressure command value and an actual hydraulic pressure when switching control from a forward range (1st to 10th) to a reverse range (RVS) is executed by the control device 100 of the automatic transmission 1. In FIGS. 8 and 9, the horizontal axis represents the passage of time, and the vertical axis represents the hydraulic pressure command value (thick line) and the actual pressure (thin line) of predetermined hydraulic friction engagement mechanisms (clutches C1 to C3 and brakes B1 to B3).

In FIG. 8, which is a comparative example, the shift position is once switched from the forward range (D range) to the reverse range (R range) (period T1), and then shifts, through the non-traveling range (N range) (period T2), to the reverse range (R range) again (period T3). In the period T1, the hydraulic pressure command value is set to a high value to bring the hydraulic friction engagement mechanisms into the engaged state, and the actual pressure is also high. In the period T2, the hydraulic pressure command value is set to a low value to release the hydraulic friction engagement mechanisms, and the actual pressure also decreases accordingly. However, the actual pressure has not completely decreased even at the end of the period T2. Therefore, when the hydraulic pressure command value is set high again in the period T3, the actual pressure rises excessively (arrow A1).

In addition, in FIG. 9 which is an embodiment, it is as follows. That is, in the period T1, the hydraulic pressure command value is set to a high value to bring the hydraulic friction engagement mechanisms into the engaged state, and the actual pressure is also high. In the period T2, the hydraulic pressure command value is set to a low value to release the hydraulic friction engagement mechanisms, and the actual pressure also decreases accordingly. However, the actual pressure has not completely decreased even at the end of the period T2 (arrow A2). Therefore, during the period T3, the hydraulic pressure command value is set to a lower value according to the actual pressure of the hydraulic friction engagement mechanisms, thereby suppressing an excessive increase in the actual pressure (arrow A3).

Here, the control procedure by the control device 100 of the automatic transmission 1 will be specifically described below with reference to FIG. 10.

Figure 10:
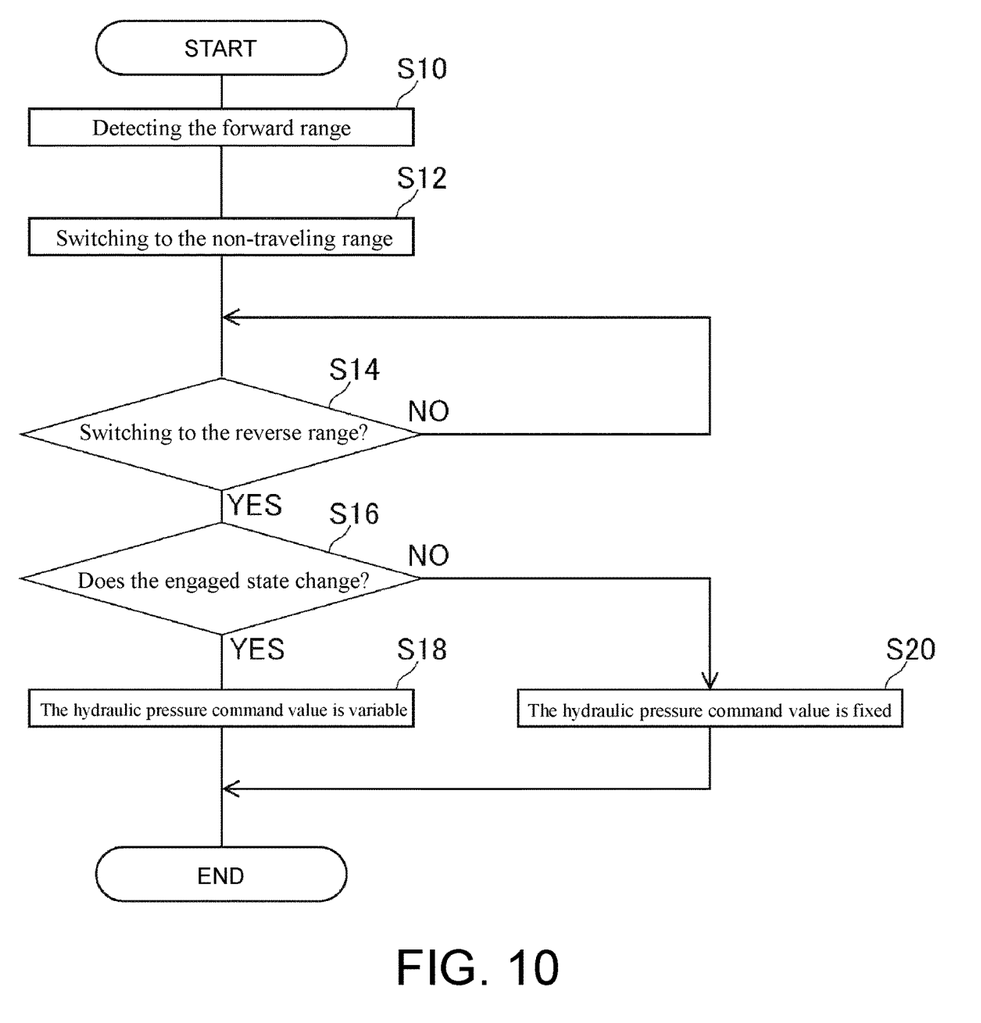
FIG. 10 is a flowchart showing switching control from a forward range to a reverse range executed by the control device of the automatic transmission.

FIG. 10 is a flowchart showing a processing procedure by the control device 100 of the automatic transmission 1. The forward/reverse switching control shown in FIG. 10 is executed when the vehicle shifts from the forward range to the reverse range via the non-traveling range.

In step S10, the automatic transmission 1 detects by the SP sensor 112 that the shift position is in the forward range. In subsequent step S12, when the shifter is operated to change the shift position from the reverse range to the non-traveling range, the automatic transmission 1 detects by the SP sensor 112 that the shift position has been switched to the non-traveling range. After that, the forward/reverse switching control proceeds to step S14.

In step S14, the automatic transmission 1 determines whether the shift position has changed from the non-traveling range to the reverse range due to the operation of the shifter. If it is determined that the shift position has changed from the non-traveling range to the reverse range (step S14: YES), the forward/reverse switching control proceeds to step S16. On the other hand, if it is not determined that the shift position has changed from the non-traveling range to the reverse range (step S14: NO), the forward/reverse switching control repeats step S14.

In step S16, the automatic transmission 1 determines whether the engaged state of each hydraulic friction engagement mechanism (clutches C1 to C3 and brakes B1 to B3) changes. For the hydraulic friction engagement mechanisms (clutches C1 to C3 and brakes B1 to B3) that change the engaged state between the forward range and the reverse range (step S16: YES), the forward/reverse switching control proceeds to step S18. On the other hand, for the hydraulic friction engagement mechanisms (clutches C1 to C3 and brakes B1 to B3) that do not change the engaged state between the forward range and the reverse range (step S16: NO), the forward/reverse switching control proceeds to step S20.

In step S18, the automatic transmission 1 specifies the hydraulic pressure command value according to the hydraulic pressure supplied to the hydraulic friction engagement mechanisms (clutches C1 to C3 and brakes B1 to B3) for the hydraulic friction engagement mechanisms (clutches C1 to C3 and brakes B1 to B3) that change the engaged state between the forward range and the reverse range.

In step S20, the automatic transmission 1 does not change the hydraulic pressure command value of the hydraulic friction engagement mechanisms (clutches C1 to C3 and brakes B1 to B3) for the hydraulic friction engagement mechanisms (clutches C1 to C3 and brakes B1 to B3) that do not change the engaged state between the forward range and the reverse range. As described above, the forward/reverse switching control ends.

[Action and Effects]

According to the control device 100 of the automatic transmission 1 according to this disclosure, the hydraulic pressure sensor 113 detects the residual pressure of the hydraulic friction engagement mechanisms (clutches C1 to C3 and brakes B1 to B3) to be connected when switching the shift stages. Then, the preparatory pressure is corrected according to the residual pressure of each hydraulic friction engagement mechanism (clutches C1 to C3 and brakes B1 to B3). In this way, the hydraulic friction engagement mechanisms (clutches C1 to C3 and brakes B1 to B3) may be suitably filled with oil regardless of the residual pressure, and in this way, a so-called zero torque capacity state may be realized. In addition, in the control device 100 of the automatic transmission 1 according to this disclosure, a high preparatory pressure may be commanded to engage the hydraulic friction engagement mechanisms (clutches C1 to C3 and brakes B1 to B3) in a short period of time depending on the situation (for example, each in-gear mode). Alternatively, among the multiple hydraulic friction engagement mechanisms (clutches C1 to C3 and brakes B1 to B3), elements that need to be engaged first may be engaged first. In this way, how to command the preparatory pressure corrected according to the residual pressure (or whether to command the preparatory pressure not corrected at all) may be made different according to each situation. In this way, the degree of correction of the preparatory pressure with respect to the residual pressure may be made different not only for each hydraulic friction engagement mechanism (clutches C1 to C3 and brakes B1 to B3), but also according to the shift situation, and it may be optimized.

In the control device 100 of the automatic transmission 1, the automatic transmission 1 includes: the input shaft 10 to which the drive force is input; the output member 11 that outputs the drive force; multiple planetary gear mechanisms P1 to P4 that transmit the drive force input from the input shaft 10 to the output member 11; and multiple hydraulic friction engagement mechanisms (clutches C1 to C3 and brakes B1 to B3) capable of establishing multiple shift stages by switching a transmission path of the drive force in the multiple planetary gear mechanisms P1 to P4. The multiple shift stages include: at least one forward range (1st to 10th) that is establishable when the multiple hydraulic friction engagement mechanisms (clutches C1 to C3 and brakes B1 to B3) are in a first state; and a reverse range (RVS) established when the multiple hydraulic friction engagement mechanisms (clutches C1 to C3 and brakes B1 to B3) are in a second state. The control device 100 includes: a detection part that detects a shift position; and a control part that controls the multiple hydraulic friction engagement mechanisms (clutches C1 to C3 and brakes B1 to B3). Switching control for switching the multiple hydraulic friction engagement mechanisms (clutches C1 to C3 and brakes B1 to B3) from one of the first state and the second state to the other is executable when the detection part detects that the shift position has been switched from one of the forward range and the reverse range to the other. In the switching control, among the multiple hydraulic friction engagement mechanisms (clutches C1 to C3 and brakes B1 to B3), a hydraulic pressure command value is fixed for the hydraulic friction engagement mechanisms (clutches C1 to C3 and brakes B1 to B3) that do not change an engaged state between the forward range (1st to 10th) and the reverse range (RVS), and among the multiple hydraulic friction engagement mechanisms (clutches C1 to C3 and brakes B1 to B3), the hydraulic pressure command value is variable based on a hydraulic pressure supplied to the hydraulic friction engagement mechanisms (clutches C1 to C3 and brakes B1 to B3) for the hydraulic friction engagement mechanisms (clutches C1 to C3 and brakes B1 to B3) that change the engaged state between the forward range (1st to 10th) and the reverse range (RVS).

According to the control device 100 of the automatic transmission 1, in the hydraulic friction engagement mechanisms (clutches C1 to C3 and brakes B1 to B3) that change the engaged state when switching the shift stages between forward range (1st to 10th) and reverse range (RVS), by making the hydraulic pressure command value variable based on the hydraulic pressure supplied to the hydraulic friction engagement mechanism (clutches C1 to C3 and brakes B1 to B3), it is possible to suppress the occurrence of abnormal noise and vibration. In addition, for hydraulic friction engagement mechanisms (clutches C1 to C3 and brakes B1 to B3) that do not change the engaged state when switching the shift stages between the forward range (1st to 10th) and the reverse range (RVS), by fixing the hydraulic pressure command value, it is possible to reduce the number of factors to be considered in the switching control of the shift stages, thereby simplifying the switching control.

In the control device 100 of the automatic transmission 1, in the switching control, among the multiple hydraulic friction engagement mechanisms (clutches C1 to C3 and brakes B1 to B3), the hydraulic pressure command value for the hydraulic friction engagement mechanisms (clutches C1 to C3 and brakes B1 to B3) that do not change the engaged state between the forward range (1st to 10th) and the reverse range (RVS) may be set higher than the hydraulic pressure command value for the hydraulic friction engagement mechanisms (clutches C1 to C3 and brakes B1 to B3) that change the engaged state between the forward range (1st to 10th) and the reverse range (RVS). According to this, it is sufficient to consider adjusting the engaged state only for the hydraulic friction engagement mechanisms (clutches C1 to C3 and brakes B1 to B3) that change the engaged state between the forward range (1st to 10th) and the reverse range (RVS). Therefore, it is possible to reduce the number of factors to be considered in the switching control of the shift stages, thereby simplifying the switching control. Further, if the hydraulic pressure command value for the hydraulic friction engagement mechanisms (clutches C1 to C3 and brakes B1 to B3) that do not change the engaged state is set lower than the hydraulic pressure command value for the hydraulic friction engagement mechanisms (clutches C1 to C3 and brakes B1 to B3) that change the engaged state between the forward range (1st to 10th) and the reverse range (RVS), since it becomes susceptible to the influence of the hydraulic pressure of the hydraulic friction engagement mechanisms (clutches C1 to C3 and brakes B1 to B3) that change the engaged state, complicated control is required, making it difficult to simplify the switching control.

In the control device 100 of the automatic transmission 1, the automatic transmission 1 may be configured such that an operating state of the automatic transmission 1 is determined by the engaged state of the hydraulic friction engagement mechanism (clutches C1 to C3 and brakes B1 to B3) with a lowest hydraulic command pressure when the automatic transmission 1 performs control by engaging the multiple hydraulic friction engagement mechanisms (clutches C1 to C3 and brakes B1 to B3). According to this, since the hydraulic friction engagement mechanisms (clutches C1 to C3 and brakes B1 to B3) that do not change the engaged state have a higher fixed hydraulic command pressure than the hydraulic friction engagement mechanisms (clutches C1 to C3 and brakes B1 to B3) that change the engaged state, it is only necessary to consider adjusting the engaged state of the hydraulic friction engagement mechanisms (clutches C1 to C3 and brakes B1 to B3) that change the engaged state. Therefore, it is possible to control the operating state of the automatic transmission 1 to a desired state while simplifying the switching control.

In the control device 100 of the automatic transmission 1, in the switching control, the control part may switch the multiple hydraulic friction engagement mechanisms (clutches C1 to C3 and brakes B1 to B3) from a third state corresponding to the non-traveling range to the first state or the second state when the detection part detects that the shift position has been switched to the forward range or the reverse range via the non-traveling range, and in the switching control, among the multiple hydraulic friction engagement mechanisms (clutches C1 to C3 and brakes B1 to B3), the hydraulic pressure command value for the hydraulic friction engagement mechanisms (clutches C1 to C3 and brakes B1 to B3) that do not change the engaged state between the non-traveling range and the forward range (1st to 10th) or the reverse range (RVS) may be set higher than the hydraulic pressure command value for the hydraulic friction engagement mechanisms (clutches C1 to C3 and brakes B1 to B3) that change the engaged state between the non-traveling range and the forward range (1st to 10th) or the reverse range (RVS). According to this, it is sufficient to consider adjusting the engaged state only for the hydraulic friction engagement mechanisms (clutches C1 to C3 and brakes B1 to B3) that change the engaged state between the non-traveling range and the forward range (1st to 10th) or the reverse range (RVS). Therefore, it is possible to reduce the number of factors to be considered in the switching control of the shift stages, thereby simplifying the switching control.

In the control device 100 of the automatic transmission 1, the hydraulic pressure command value may be a reference pressure set for a hydraulic circuit that supplies hydraulic pressure to the hydraulic friction engagement mechanism (clutches C1 to C3 and brakes B1 to B3) in order to control the engaged state of the hydraulic friction engagement mechanism (clutches C1 to C3 and brakes B1 to B3). According to this, instead of adjusting the hydraulic pressure supplied to the hydraulic friction engagement mechanisms (clutches C1 to C3 and brakes B1 to B3) themselves, the preparatory pressure that may be used when controlling the engaged state of the hydraulic friction engagement mechanism (clutches C1 to C3 and brakes B1 to B3) is controlled. Therefore, it is possible to effectively suppress the generation of noise due to excessive supply of the preparatory pressure and the reduction in responsiveness due to insufficient supply of the preparatory pressure.

In the control device 100 of the automatic transmission 1, the shift position may be selected by a shifter in which the forward range, a neutral range, and the reverse range are disposed in this order. For example, the shifter applied to the automatic transmission 1 may be a dial-type shifter or a lever-type shifter with a forward range, a neutral range, and a reverse range disposed in that order. In such a shifter, the shift position is changed from the forward range to the reverse range via the neutral range, or conversely from the reverse range to the forward range via the neutral range. By executing the above-described switching control when the shift position passes through the neutral range in this way, it is possible to reduce the number of factors to be considered in the switching control of the shift stages while suppressing the reduction in responsiveness, thereby simplifying the switching control.

[Modification]

The above-described embodiments may be implemented in various forms modified or improved based on the knowledge of those skilled in the art.

For example, in the above-described embodiment, the forward/reverse switching control shown in FIG. 10 is executed when the vehicle shifts from the forward range to the reverse range via the non-traveling range. However, the forward/reverse switching control may be executed when the forward range is shifted to the reverse range without going through the non-traveling range. In this case, step S12 in the flowchart of FIG. 10 is omitted. Further, the forward/reverse switching control may be executed when shifting from the reverse range to the forward range via the non-traveling range. In this case, detection of the reverse range is performed in step S10 in the flowchart of FIG. 10, and at the same time, it is determined whether there is a switch to the forward range in step S14. Further, the forward/reverse switching control may be executed when the reverse range is shifted to the forward range without going through the non-traveling range. In this case, detection of the reverse range is performed in step S10 in the flowchart of FIG. 10; then, it is determined whether there is a switch to the forward range in step S14, and step S12 is omitted.

Furthermore, in the forward/reverse switching control, the control device 100 of the automatic transmission 1 may switch the multiple hydraulic friction engagement mechanisms (clutches C1 to C3 and brakes B1 to B3) from the third state corresponding to the non-traveling range to the first state when the SP sensor 112 detects that the shift position has been switched to the forward range via the non-traveling range. At this time, in the forward/reverse switching control, among the multiple hydraulic friction engagement mechanisms (clutches C1 to C3 and brakes B1 to B3), the hydraulic pressure command value for the hydraulic friction engagement mechanisms (clutches C1 to C3 and brakes B1 to B3) that do not change the engaged state between the non-traveling range and the forward range is set higher than the hydraulic pressure command value for the hydraulic friction engagement mechanisms (clutches C1 to C3 and brakes B1 to B3) that change the engaged state between the non-traveling range and the forward range.

Further, in the forward/reverse switching control, among the multiple hydraulic friction engagement mechanisms (clutches C1 to C3 and brakes B1 to B3), the control device 100 of the automatic transmission 1 may set the hydraulic pressure command value for the hydraulic friction engagement mechanisms (clutches C1 to C3 and brakes B1 to B3) that do not change the engaged state between the forward range (1st to 10th) and the reverse range (RVS) to be lower than the hydraulic pressure command value for the hydraulic friction engagement mechanisms (clutches C1 to C3 and brakes B1 to B3) that change the engaged state between the forward range (1st to 10th) and the reverse range (RVS). Depending on the switching pattern of the shift stages (for example, when switching from the D range or the R range to the D range via the N range, or when switching from the D range or the R range to the R range via the N range), each hydraulic friction engagement mechanism (clutches C1 to C3 and brakes B1 to B3) includes those that transmit torque (including those that primarily transmit torque) and those that do not transmit torque (including those that do not primarily transmit torque). Specifically, although the brake B2 is engaged in the first forward shift stage (1st), the brake B2 does not primarily transmit torque. This is because torque must be transmitted by the brake B2 in the second forward shift stage (2nd) and above, and the control is made more efficient by engaging the brake B2 in advance even in the first forward shift stage (1st). Therefore, the hydraulic pressure command value is set low for the brake B2, which does not primarily transmit torque, so that it does not block the oil supply to another hydraulic friction engagement mechanism (for example, the brake B1) that is engaged and transmits torque. By controlling the control device 100 in this way, for example, appropriate oil pressure command values may be set for hydraulic friction engagement mechanisms (clutches C1 to C3 and brakes B1 to B3) that do not transmit torque and that do not change the engaged state between the forward range (1st to 10th) and the reverse range (RVS).

What is claimed is:

1. A control device of an automatic transmission, wherein the automatic transmission comprises:
    an input shaft to which a drive force is input;
    an output member that outputs the drive force;
    a plurality of planetary gear mechanisms that transmit the drive force input from the input shaft to the output member; and
    a plurality of hydraulic friction engagement mechanisms capable of establishing a plurality of shift stages by switching a transmission path of the drive force in the plurality of planetary gear mechanisms,
wherein the plurality of shift stages comprise:
    at least one forward range that is establishable when the plurality of hydraulic friction engagement mechanisms are in a first state; and
    a reverse range established when the plurality of hydraulic friction engagement mechanisms are in a second state,
wherein the control device comprises:
    a detection part that detects a shift position; and
    a control part that controls the plurality of hydraulic friction engagement mechanisms,
wherein switching control for switching the plurality of hydraulic friction engagement mechanisms from one of the first state and the second state to the other is executable when the detection part detects that the shift position has been switched from one of the forward range and the reverse range to the other, and
wherein each of the plurality of hydraulic friction engagement mechanisms has a corresponding hydraulic pressure command value, such that there are a plurality of hydraulic pressure command values, and
in the switching control,
    for the hydraulic friction engagement mechanisms that do not change an engaged state between the forward range and the reverse range, a hydraulic pressure command value is fixed and
    for the hydraulic friction engagement mechanisms that change the engaged state between the forward range and the reverse range, a hydraulic pressure command value of a respective hydraulic friction engagement mechanism is determined based on a hydraulic pressure supplied to the respective hydraulic friction engagement mechanism.

2. The control device of the automatic transmission according to claim 1, wherein in the switching control, among the plurality of hydraulic friction engagement mechanisms, the hydraulic pressure command value for the hydraulic friction engagement mechanisms that do not change the engaged state between the forward range and the reverse range is set higher than the hydraulic pressure command value for the hydraulic friction engagement mechanisms that change the engaged state between the forward range and the reverse range.

3. The control device of the automatic transmission according to claim 2, wherein the automatic transmission is configured such that an operating state of the automatic transmission is determined by the engaged state of the hydraulic friction engagement mechanism with a lowest hydraulic pressure command value when the automatic transmission performs control by engaging the plurality of hydraulic friction engagement mechanisms.

4. The control device of the automatic transmission according to claim 3, wherein the hydraulic pressure command value is a reference pressure set for a hydraulic circuit that supplies hydraulic pressure to the hydraulic friction engagement mechanism in order to control the engaged state of the hydraulic friction engagement mechanism.

5. The control device of the automatic transmission according to claim 4, wherein the shift position is selected by a shifter in which the forward range, a neutral range, and the reverse range are disposed in this order.

6. The control device of the automatic transmission according to claim 3, wherein the shift position is selected by a shifter in which the forward range, a neutral range, and the reverse range are disposed in this order.

7. The control device of the automatic transmission according to claim 2, wherein in the switching control, the control part is able to switch the plurality of hydraulic friction engagement mechanisms from a third state corresponding to the non-traveling range to the first state or the second state when the detection part detects that the shift position has been switched to the forward range or the reverse range via the non-traveling range, and in the switching control, among the plurality of hydraulic friction engagement mechanisms, the hydraulic pressure command value for the hydraulic friction engagement mechanisms that do not change the engaged state between the non-traveling range and the forward range or the reverse range is set higher than the hydraulic pressure command value for the hydraulic friction engagement mechanisms that change the engaged state between the non-traveling range and the forward range or the reverse range.

8. The control device of the automatic transmission according to claim 7, wherein the hydraulic pressure command value is a reference pressure set for a hydraulic circuit that supplies hydraulic pressure to the hydraulic friction engagement mechanism in order to control the engaged state of the hydraulic friction engagement mechanism.

9. The control device of the automatic transmission according to claim 8, wherein the shift position is selected by a shifter in which the forward range, a neutral range, and the reverse range are disposed in this order.

10. The control device of the automatic transmission according to claim 7, wherein the shift position is selected by a shifter in which the forward range, a neutral range, and the reverse range are disposed in this order.

11. The control device of the automatic transmission according to claim 2, wherein the hydraulic pressure command value is a reference pressure set for a hydraulic circuit that supplies hydraulic pressure to the hydraulic friction engagement mechanism in order to control the engaged state of the hydraulic friction engagement mechanism.

12. The control device of the automatic transmission according to claim 11, wherein the shift position is selected by a shifter in which the forward range, a neutral range, and the reverse range are disposed in this order.

13. The control device of the automatic transmission according to claim 2, wherein the shift position is selected by a shifter in which the forward range, a neutral range, and the reverse range are disposed in this order.

14. The control device of the automatic transmission according to claim 1, wherein in the switching control, among the plurality of hydraulic friction engagement mechanisms, the hydraulic pressure command value for the hydraulic friction engagement mechanisms that do not change the engaged state between the forward range and the reverse range is set lower than the hydraulic pressure command value for the hydraulic friction engagement mechanisms that change the engaged state between the forward range and the reverse range.

15. The control device of the automatic transmission according to claim 14, wherein the hydraulic pressure command value is a reference pressure set for a hydraulic circuit that supplies hydraulic pressure to the hydraulic friction engagement mechanism in order to control the engaged state of the hydraulic friction engagement mechanism.

16. The control device of the automatic transmission according to claim 15, wherein the shift position is selected by a shifter in which the forward range, a neutral range, and the reverse range are disposed in this order.

17. The control device of the automatic transmission according to claim 14, wherein the shift position is selected by a shifter in which the forward range, a neutral range, and the reverse range are disposed in this order.

18. The control device of the automatic transmission according to claim 1, wherein the hydraulic pressure command value is a reference pressure set for a hydraulic circuit that supplies hydraulic pressure to the hydraulic friction engagement mechanism in order to control the engaged state of the hydraulic friction engagement mechanism.

19. The control device of the automatic transmission according to claim 18, wherein the shift position is selected by a shifter in which the forward range, a neutral range, and the reverse range are disposed in this order.

20. The control device of the automatic transmission according to claim 1, wherein the shift position is selected by a shifter in which the forward range, a neutral range, and the reverse range are disposed in this order.

* * * * *